United States Patent [19]
Van Eijk et al.

[11] Patent Number: 5,243,491
[45] Date of Patent: Sep. 7, 1993

[54] ELECTROMAGNETIC SUPPORT WITH CURRENT-INDEPENDENT CHARACTERISTICS

[75] Inventors: Jan Van Eijk; Henricus E. Beekman; Hendrikus H. M. Cox, all of Eindhoven, Netherlands

[73] Assignee: U.S. Philips Corporation, New York, N.Y.

[21] Appl. No.: 664,075

[22] Filed: Mar. 4, 1991

[30] Foreign Application Priority Data

Aug. 30, 1990 [NL] Netherlands .......................... 9001910

[51] Int. Cl.$^5$ ............................................ H02N 15/00
[52] U.S. Cl. .................................. 361/144; 361/146; 324/207.12
[58] Field of Search .................. 310/90.5; 324/207.11, 324/207.12, 207.13; 361/139, 143, 144, 146

[56] References Cited

U.S. PATENT DOCUMENTS

| | | | |
|---|---|---|---|
| 4,795,927 | 1/1989 | Morii et al. | 310/90.5 |
| 5,013,987 | 5/1991 | Wakui | 310/90.5 |
| 5,066,879 | 11/1991 | Yamamura | 310/90.5 |
| 5,093,754 | 3/1992 | Kawashima | 361/141 |

OTHER PUBLICATIONS

E. M. H. Kamerbeek, "Magnetic Bearings", Philips Technical Review, vol. 41, No. 11/12, 1983/84, pp. 348-361.

*Primary Examiner*—Jeffrey A. Gaffin
*Attorney, Agent, or Firm*—Paul R. Miller

[57] ABSTRACT

A device for positioning a body (5) by means of at least two electromagnets (13, 15). A position sensor (29) measures the size of an air gap (23) between one of the electromagnets (13, 15) and a guide beam (1). An output signal of the position sensor (29) is applied to a linear electronic control unit (35) which passes a control current through the electromagnets (13, 15) in dependence on a difference between the measured and a desired size of the air gap (23). An electronic root extractor (37) is connected between the control unit (35) and the two electromagnets (13, 15). An output signal of the root extractor (37) has a value equal to the square root of a control signal coming from the control unit (35). In this way a force exerted by the electromagnets (13, 15) on the guide beam (1) is proportional to the value of the control signal, so that a control is obtained with the linear control unit (35) in which the stiffness and bandwidth are independent of the value of the control current.

Since the electrical resistance losses in the electromagnets (13, 15) in such a device are low, the device is particularly suitable for use as an electromagnetic bearing in an optical lithographical device for the irradiation of semiconductor substrates, or in other precision machines.

12 Claims, 4 Drawing Sheets

ELECTROMAGNETIC SUPPORT WITH CURRENT-INDEPENDENT CHARACTERISTICS

The invention relates to a device for positioning a body in at least one support direction by means of at least one electromagnet and at least one position sensor, an electrical output of the position sensor being connected to an electrical input of an electronic control unit with which an electric current in the electromagnet is controllable as a function of a difference between a position of the body relative to the electromagnet as measured by the position sensor and a desired position.

Of interest are commonly owned copending applications Ser. No. 664,074 entitled "Electromagnetic Support with Unilateral Control Currents" in the name of Cox et al. and Ser. No. 664,162 entitled "Electromagnetic Support With Position-Independent Characteristics" in the name of Boon et al. both filed concurrently with the instant application.

BACKGROUND OF THE INVENTION

Philips Technical Review, vol. 41, no. 11/12, 1983/84, pp. 348–361, disclosed a device of the kind described in the opening paragraph in which a shaft is supported by five pairs of electromagnets in such a way that rotation of the shaft is possible only about the centerline of the shaft. A force exerted on the shaft by an electromagnet is substantially directly proportional to the square of the value of the current through the electromagnet and substantially inversely proportional to the square of the size of the air gap between the electromagnet and the shaft. As a result of the relation between the electromagnetic force and the size of the air gap, the position of the shaft relative to the electromagnets is not stable unless additional measures are taken. To maintain a stable desired position of the shaft in the known device, the position of the shaft relative to each pair of electromagnets is measured by means of a position sensor, and a control current determined from the difference between the measured and the desired position is passed through the two electromagnets of the relevant pair. The value of the control current is thereby determined by means of a control unit having a proportional, differentiating the integrating action (PID controller). A stable support is obtained through the electromagnets controlled by the PID controller.

As a result of the non-linear relation between the electromagnetic force and the values of the air gap and the current, the known device constitutes a non-linear system. The PID controller used is a linear control unit which in the known device is optimized for a working point determined by a desired size $h_0$ of the air gap and by a basic current $i_0$ through the electromagnets. A number of characteristics, however, which determine the stability of the support, such as stiffness and bandwidth, are dependent on the value of the basic current, while the PID controller used functions optimally only in the case of relatively small loads on the shaft, i.e. when the control currents through the electromagnets are small compared with the basic current. Stability problems may accordingly occur in the case of heavy loads on the shaft, sudden peak loads and upon switching on of the device.

SUMMARY OF THE INVENTION

The invention has for its object to provide a device for positioning a body in which the stiffness and bandwidth are independent of the value of the current through the electromagnets, so that the disadvantages described above may be avoided.

The invention is for this purpose characterized in that an electric root extractor is connected between an electrical output of the control unit and the electromagnet controlled by the control unit. The use of the electronic root extractor achieves that the current through the electromagnet controlled by the control unit is proportional to the square root of a control signal whose value is determined by the control unit. In this way the force exerted by the relevant electromagnet is proportional to the value of the control signal of the control unit, so that the stiffness and bandwidth of the device are independent of the value of the current through the electromagnet and the control unit functions optimally for all loads on the body to be supported.

A particular embodiment of a device according to the invention, in which during operation the body is supported in the support direction by means of a pair of electromagnets which, seen in the support direction, are located opposite one another, while the currents through the two electromagnets of the pair are controlled by a control unit which is common to the two electromagnets of the pair, is characterized in the between the control unit and each of the two electromagnets controlled by the control unit an electronic rot extractor is connected which is unique to the relevant electromagnet. In this particular embodiment, the two electromagnets of the pair are fed with a constant basic current, and a bilateral support of the body with a high loading capability is provided in that the electromagnet, whose air gap has increased as a result of a displacement of the body from the desired position owing to a static load, is supplied with a control current having a direction equal to that of the basic current, while the other electromagnet is supplied with a control current having a direction opposite to that of the basic current. In this embodiment a control action which is independent of the values of the currents is obtained through the use of the said unique root extractors.

A further embodiment of a device according to the invention, in which again a pair of electromagnets and a control unit common to this pair are used, is characterized in that between the control unit and each of the two electromagnets controlled by the control unit an electronic root extractor and an electronic rectifier are connected which are unique to the relevant electromagnet, the two rectifiers being electrically oppositely directed. In this embodiment the electromagnets are supplied with a control current only, not with a basic current. It is achieved through the use of the said rectifiers that, in the case of a displacement of the body from the desired position owing to a static load, only that electromagnet whose air gap has been increased as a result of this displacement is supplied with a current. The electrical resistance losses of the electromagnets are kept low in this way, while a finite stiffness is achieved, also in a no-load condition of the body, through the use of the root extractors.

A still further embodiment of a device according to the invention, in which the rectifiers are connected in an efficient and practical position relative to the root extractors, is characterized in that the rectifiers are connected between the control unit and each of the two root extractors connected to the control unit. It is achieved by this that an input signal of each of the root extractors always has a same polarity, so that an unstable operation of the root extractors around the zero crossing of the input signal is avoided.

A special embodiment of a device according to the invention, in which a pair of electromagnets and a control unit common to the pair are used, while the electromagnets are not supplied with a basic current, is characterized in that between the control unit and the two electromagnets controlled by the control unit an electronic root extractor is connected which is common to the two electromagnets, while between the root extractor and each of the two electromagnets an electronic rectifier is connected which is unique to the relevant electromagnet, the two rectifiers being electrically oppositely directed. The use of the common root extractor provides a simple construction of the device.

IN THE DRAWING

The invention will be explained in more detail with reference to the drawing, in which.

Figure 1:
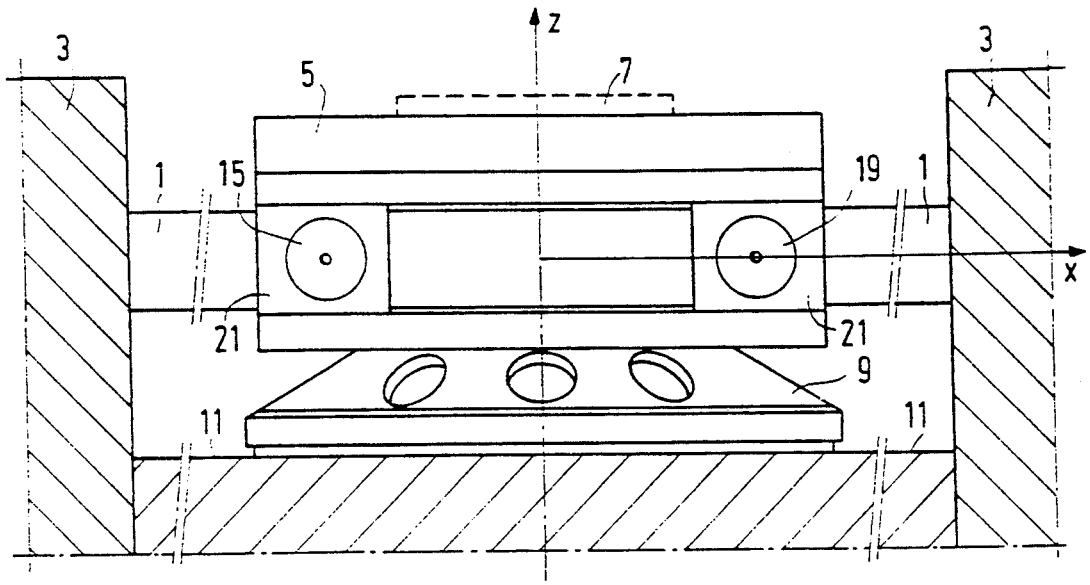
FIG. 1 is a lateral elevation of a device according to the invention.
Figure 4:
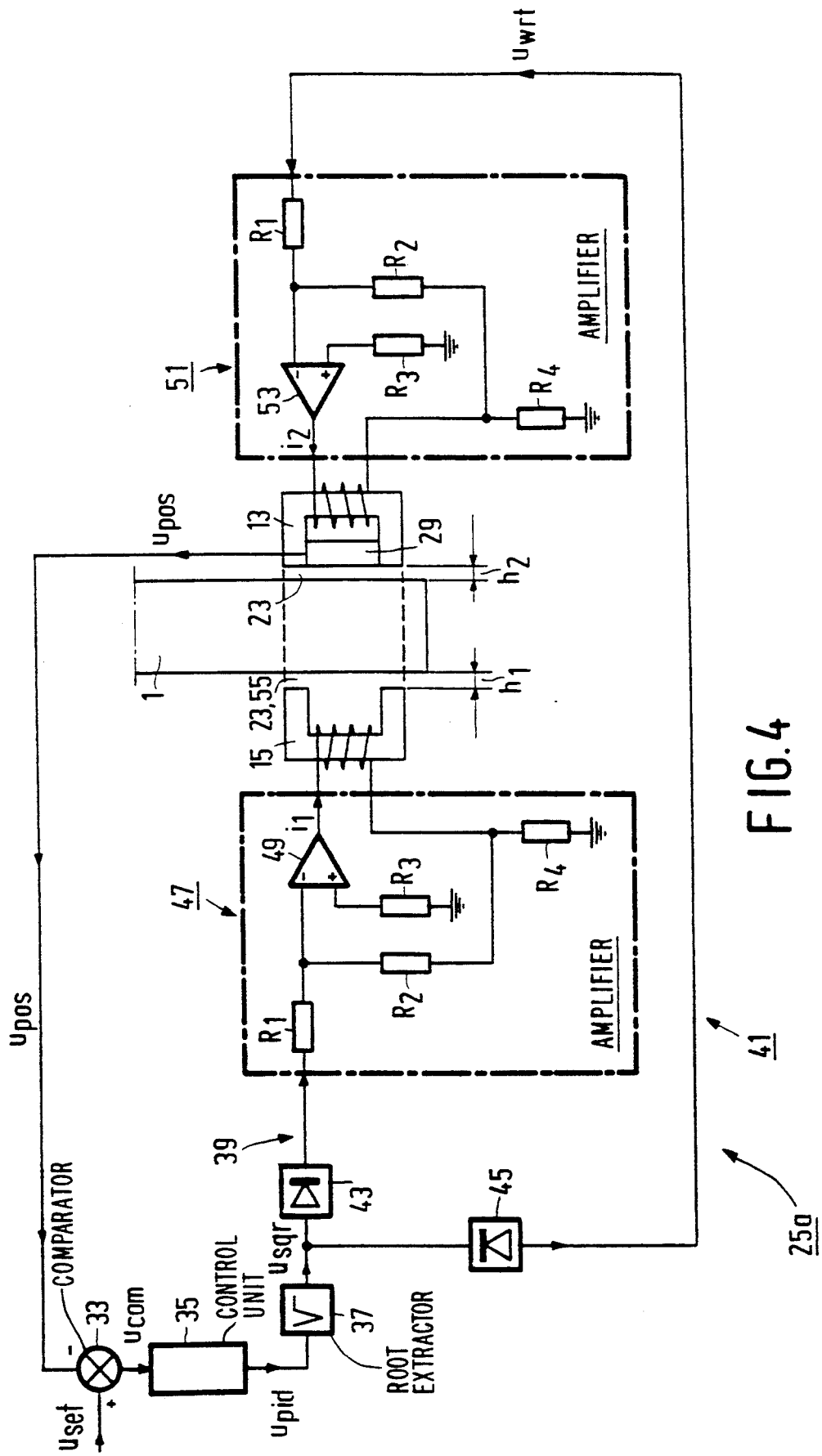
Figure 5:
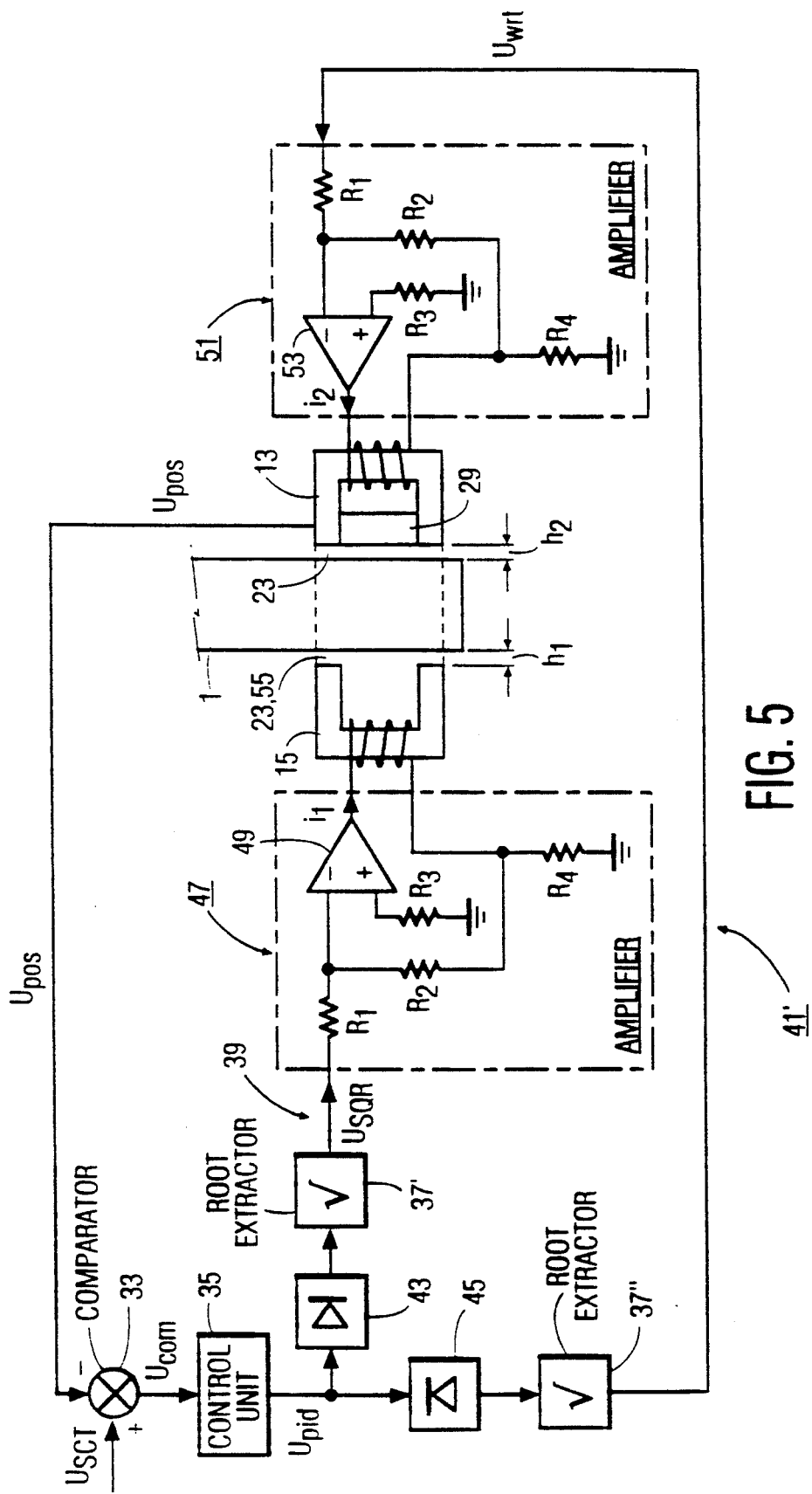

FIG. 4 diagrammatically shows the device according to FIG. 1 comprising an electronic control circuit, and FIG. 5 illustrates a second embodiment of the present invention.

DESCRIPTION OF THE PREFERRED EMBODIMENT

The device illustrated in FIGS. 1 to 5 comprises a straight guide with a steel guide beam 1 which extends in a horizontal direction parallel to the x-direction in FIG. 1 and which is mounted to a frame 3 near both its ends, a table 5 being displaceable in the x-direction along the guide beam 1. An object 7 (shown in dashed lines) fastened to the table 5 an be positioned in the x-direction by driving means not shown in any detail in the FIGS.

The table 5 is provided with a round, aerostatically supported foot 9 of a kind known from Netherlands Patent Application 8902472 which corresponds to commonly owned copending application Ser. No. 594,519 filed Oct. 4, 1990 in the name of Engelen et al. Of further interest is commonly owned U.S. Pat. No. 4,737,823. During operation, the foot 9 has its support on a granite base surface 22 by means of a static gas bearing of a type known per se pretensioned with an underpressure, which base surface 11 extends in a horizontal plane parallel to the x-direction and to a horizontal y-direction which is perpendicular to the x-direction (see FIG. 2). The use of the aerostatically supported foot 9 in combination with the base surface 11 prevents a translation of the table 5 in a z-direction perpendicular to the base surface 11 as well as a rotation of the table 5 about an axis of rotation which extends parallel to the x-direction or y-direction.

Figure 2:
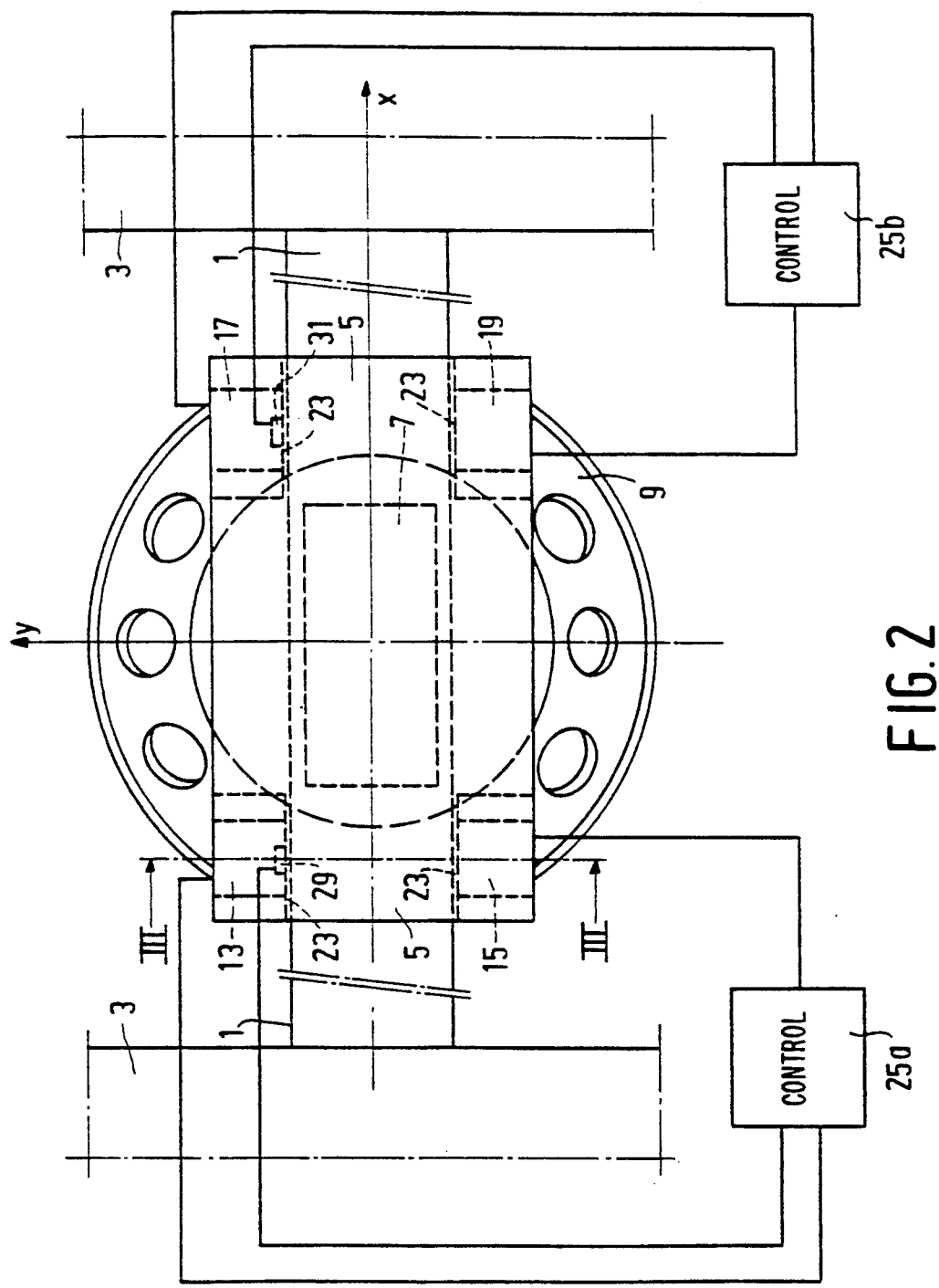
FIG. 2 is a plan view of the device according to FIG. 1.

A translation of the table 5 to the y-direction and a rotation of the table 5 about an axis of rotation parallel to the z-direction are prevented through the use of two pairs of electromagnets (13, 15) and (17, 19), these two pairs being fastened at some distance from one another in a bearing block 21 provided between the table 5 and the foot 9 and surrounding the guide beam 1 (see FIGS. 1 and 2). As can be seen in FIG. 2, the two electromagnets (13, 15) and (17, 19) of each pair are located opposite one another on either side of the guide beam 1, seen in the y-direction.

When an electric current is passed through the electromagnets 13, 15, 17, 19, each of the electromagnets 13, 15, 17, 19 will exert an attracting electromagnetic force on the steel guide beam 1. The extent of this force is substantially directly proportional to the square of the value of the current through the relevant electromagnet 13, 15, 17, 19, and substantially inversely proportional to the square of the size of an air gap 23 between the relevant electromagnet 13, 15, 17, 19 (see FIG. 2) and the guide beam 1. As a result of the relation between the electromagnetic force and the size of the air gap 23, an equilibrium condition, in which the attracting forces of the two electromagnets of each pair (13, 15) and (17, 19) are equal, will be unstable if the current through the electromagnets 13, 15, 17, 19 is a constant, non-controlled current. For, if the table 5 is displaced from the equilibrium position over a small distance parallel to the y-direction, the attracting forces of the electromagnets whose air gaps 23 are made smaller by the displacement will increase and the attracting forces of the electromagnets whose air gaps 23 are made wider by the displacement will decrease. A resultant force in the direction of the displacement follows, so that the displacement will be further increased.

In order to obtain a stable support in the y-direction, the current through the electromagnets of the pairs (13, 15) and (17, 19) is controlled by means of respective electronic control circuits 25a and 25b (see FIG. 2). The control circuits 25a and 25b are identical. Each of the two pairs of electromagnets (13, 15) and (17, 19) is provided with a contactless capacitive position sensor 29, 31 of a kind known per se which is fitted in one of the two electromagnets of the relevant pair (13, 15), (17, 19) (see FIG. 2). During operation, each of the position sensors 29, 31 measures the size of the air gap 23 between the guide beam 1 and the electromagnet 13, 17 in which the relevant position sensor 29, 31 is fitted. The control circuits 25a, 25b compare the measured sizes of the two air gaps 23 with a desired size and pass control currents through the electromagnets 13, 15, 17, 19 whose values depend on the difference between the desired and the measured sizes, so that the measured size becomes equal to the desired size under the influence of the electromagnet forces exerted on the guide beam 1. The operation and characteristics of the control circuits 25a, 25b will be further explained below.

FIG. 4 diagrammatically shows the electronic control circuit 25a which is representative. An electrical output of the relevant position sensor 29, 31 in each control circuit 25a, 25b is connected to a first electrical input of a summation circuit which acts as a comparator 33. An output signal $u_{pos}$ (voltage signal) of the position sensor 29, 31, the value of which depends on the size of the air gap 23, is compared by the comparator 33 with an input signal $u_{set}$ of a second electrical input of the comparator 33, the value of which depends on the desired size of the air gap 23. An output signal $u_{com}$ of the comparator 33 is equal to the difference $u_{set} - u_{pos}$ of the two input signals of the comparator 33. The signal $u_{com}$ forms an input signal for an electronic control unit 35. The control unit 35 is a PID controller which is known per se and which is of a usual type having a proportional, integrating and differentiating control action, transforming the signal $u_{com}$ into a control signal $u_{pid}$ (voltage signal) which determines the value of the current through the electromagnets 13 and 15. As is shown in FIG. 4, the control signal $u_{pid}$ is applied to an electronic root extractor 37 of a type known per se. An output signal $u_{sqr}$ of the root extractor 37 has a value equal to the square root of the value of the signal $u_{pid}$, while the sign (polarity) of the signal $u_{sqr}$ is the same as that of the signal $u_{pid}$:

$$u_{sqr} = \frac{u_{pid}}{|u_{pid}|} \cdot \sqrt{|u_{pid}|}$$

An electrical output of the root extractor 37 is connected to the electromagnet 15 via a first branch 39 of the control circuit 25, and to the electromagnet 13 via a second branch 41 of the control circuit 25. The branches 39 and 41 are provided with an electronic rectifier 43 and an electronic rectifier 45, respectively. The rectifiers 43 and 45, which both operate as diodes, are of a conventional type and may be of analog design (a comparator circuit with a half-wave rectification action), or of digital design (a logic circuit). The rectifiers 43 and 45 are electrically oppositely directed relative to the signal $u_{sqr}$, so that they conduct the signal $u_{sqr}$ each in a different direction. The function of the rectifiers 43, 45 in the control circuit 25a will be further explained below.

The output of the root extractor 37 is connected to an amplifier unit 47 of a conventional type, which is provided with an operational amplifier 49, via the rectifier 43 in branch 39. The amplifier unit 47 amplifies the voltage signal $u_{sqr}$ to a control current $i_1$ through the electromagnet 15. Furthermore, the output of the root extractor 37 is connected to an amplifier unit 51, which is of the same kind as the amplifier unit 47 and provided with an operational amplifier 53, via the rectifier 45 in branch 41. The amplifier unit 51 amplifies the voltage signal $u_{sqr}$ to a control current $i_2$ through the electromagnet 13. The approximate values of the forces $F_1$ and $F_2$ exerted by the electromagnets 13 and 15 on the guide beam 1 can be written as follows:

$$F_1 \sim \frac{i_1^2}{h_1^2} \text{ and } F_2 \sim \frac{i_2^2}{h_2^2}$$

In these expressions, $h_1$ is the size of the air gap 55 between the guide beam 1 and the electromagnet 15 and $h_2$ is the size of the air gap 23 between the guide beam 1 and the electromagnet 13. The following holds for the control currents $i_1$ and $i_2$:

$$i_1 \sim u_{sqr} \sim \sqrt{u_{pid}} \text{ and } i_2 \sim u_{sqr} \sim \sqrt{u_{pid}}$$

so that:

$$F_1 \sim \frac{u_{pid}}{h_1^2} \text{ and } F_2 \sim \frac{u_{pid}}{h_2^2}$$

The use of the root extractor 37 insures that there is a linear relation between the forces $F_1$ and $F_2$ and the value of the control signal $u_{pid}$. A position control is thus achieved with the conventional, linear PID controller 35 which functions optimally for any value of the currents $i_1$ and $i_2$ through the electromagnets 13 and 15, i.e. a control is obtained through the use of the root extractor 37 whereby the stiffness and bandwidth are independent of the value of the current through the electromagnets.

A further advantage of the control is that a basic current through the electromagnets is unnecessary. The control circuit 25a and 25b in fact only pass control currents $i_1$, $i_2$ through the electromagnets 13, 15, which renders the use of the rectifiers 43 and 45 necessary. Indeed, since a force exerted by one of the two electromagnets 13, 15 on the guide beam 1 is always an attracting force, irrespective of the direction of the control current through the relevant electromagnet, the forces of the two electromagnets 13, 15 without the use of the rectifiers 43, 45 would be permanently the same, and a position control would not be possible. Thanks to the use of the rectifiers 43, 45, the electromagnet 13 only is provided with a control current $i_2$ in the case of a static load on the table 5, while $i_1$ is equal to zero, if the measured size of the air gap 23 is greater than the desired size. With such a load, electromagnet 15 only is provided with a control current $i_1$, while $i_2$ is equal to zero, if the measured size of the air gap 23 is smaller than the desired size. Since there is no basic current through the electromagnets 13, 15, and only one of the electromagnets 13, 15 receives a control current, the electrical resistance losses of the electromagnets 13, 15 are low. The resistance losses in a no-load condition of the table 5 are even negligibly small. It should be noted that the control unit 35 is optimized for a working point determined by a desired size $h_0$ of the air gap 23. The stiffness and the bandwidth of the device shown in FIGS. 1 to 4, therefore, are dependent on the value of $h_0$. This dependence is no disadvantage if the device is used as an electromagnetic bearing, where $h_0$ is an unchanging, desired size of the air gap. Accordingly, the device is eminently suitable for application in an optical lithographic positioning device for the manufacture of masks to be used in the production of integrated circuits. Dimensional inaccuracies can arise in such positioning devices, and also in other precision machines with electromagnetic supports, as a result of heat generation in the electromagnets. Such inaccuracies can be avoided through the use of a device according to FIG. 4. In addition, very small air gaps can be used, which renders possible a reduction in the required control current values, so that the resistance losses resulting therefrom can be even further diminished.

It should further be noted as shown in FIG. 5, that it is possible to include a root extractor in each branch 39, 41 of the control circuit unique to a different corresponding relevant electromagnet instead of the root extractor 37 which is common to both electromagnets 13, 15. Rectifier 43 and root extractor 37' couple the control unit 35 output to amplifier unit 47 operational amplifier 49 inverting input. Rectifier 45 and root extractor 37" couple control unit 35 output to amplifier unit 51 operational amplifier 53 inverting input. In other respects, the embodiment of FIG. 5 is the same as that of FIG. 4. In FIG. 5, rectifier 43 between unit 35 and extractor 37' is unique to the electromagnet 15 and rectifier 45 between unit 35 and extractor 37" is unique to electromagnet 13. In this embodiment the input signal of each root extractor always has a same polarity, so that an unstable operation which the root extractors could display around the zero crossing of the input signal is avoided.

It should also be noted that the control unit 35, the root extractor 37 and the two rectifiers 43, 45 may be replaced by a digital control unit (not shown) in which the functions of the control unit 35, the root extractor 37 and the rectifiers 43, 45 are united.

It is additionally noted that the amplifier units 47 and 51 may be replaced by an amplifier unit (not shown) common to both electromagnets 13, 15 and connected between the root extractor 37 and the rectifiers 43, 45. The rectifiers 43, 45 in this embodiment may be constructed as diodes.

It should further be noted that the rectifiers 43 and 45 may be omitted in the control circuits 25a, 25b if no particular requirements are imposed on the heat generation in the electromagnets. The electromagnets are then supplied with a constant basic current, while in each branch 39, 41 a root extractor unique to the relevant electromagnet 13, 15 has to be included in order to obtain a control independent of the current value. The control signal $u_{pid}$, which determines the control currents through the electromagnets 13, 15, should then be added to and subtracted from a basic signal $u_0$, which determines the basic current through the electromagnets, before the relevant root extractor in the branches 39 and 41 respectively. In this way a bilateral support is obtained in the relevant support direction.

It is further pointed out that a simple embodiment of the device is obtained in that only one of the two electromagnets 13, 15 is controlled in conjunction with a basic current. The other electromagnet in this embodiment is provided with a basic current only and serves exclusively as a counterbalancing magnet. A counterbalancing force may also be achieved by other means such as, for example, vacuum, a permanent magnet, a gas spring or a mechanical spring. The force of gravity acting on the body to be supported may also be used as the counterbalancing force. In these cases only one electromagnet is used in the relevant support direction.

In the device according to FIGS. 1 to 4, the electromagnets 13, 15 are located opposite one another on either side of the guide beam 1. It is noted that the electromagnets 13, 15 may also be otherwise located than in FIG. 4, i.e. with the U-shaped sides facing away from one another. In the latter case the pair 13, 15 is located between a first and a second part of the guide beam, the two parts being parallel.

Figure 3:
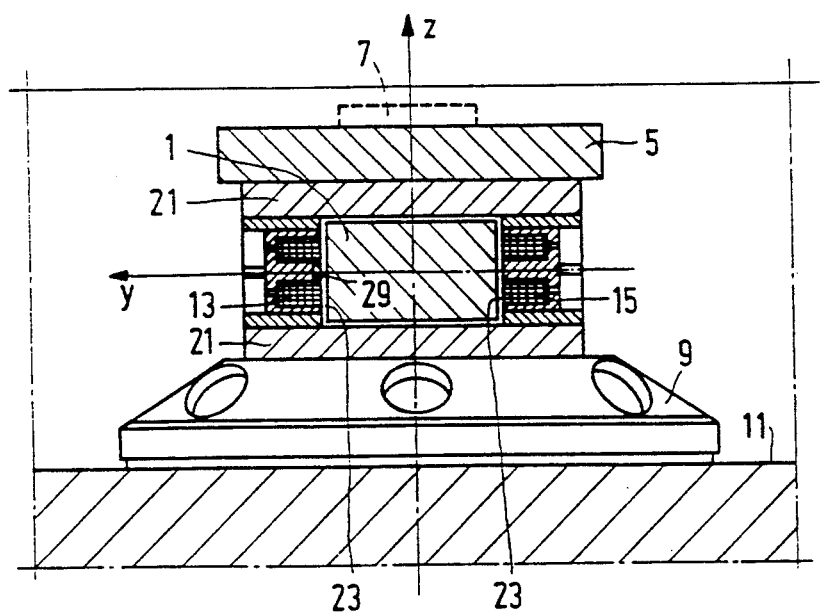
FIG. 3 is a cross-section of the device taken on the line III—III in FIG. 2.

Finally, it is noted that two degrees of freedom of the table 5 are suppressed by means of two pairs of electromagnets (13, 15) and (17, 19) in the device according to FIGS. 1, 2 and 3, viz. a translation parallel to the y-direction and a rotation about an axis extending parallel to the z-direction. If more pairs of electromagnets are used in such a device, more than two degrees of freedom of the body to be supported can also be suppressed. If a more compact construction of the device is required, the number of electromagnets used for the support may be reduced. This can be done, for example, by supporting the body in two directions by means of three electromagnets positioned at an angle of 120° relative to one another in a plane which is perpendicular to the said directions. An adapted control of the electromagnets is necessary for this with interlinked control circuits.

What is claimed is:

1. A device for positioning a body in at least one support direction relative to a support comprising:
    a body;
    at least one electromagnet for supporting the body relative to said support in the support direction;
    at least one position sensor for producing an output signal manifesting the relative position of said body to said support; and
    electronic control means for said at least one electromagnet including 1) a control unit responsive to said at least one sensor output signal applied thereto for generating an electromagnet control current at a control unit output as a function of the difference between a position of the body relative to said support and a desired position and 2) root extractor means coupled to said control unit output and said at least one electromagnet for generating a root signal having a value which is a root of the value of said control current.

2. The device of claim 1 including a pair of electromagnets for supporting the body in the support direction said electromagnets being opposite one another in the support direction, each said electromagnets receiving a control current controlled by said control unit, said root extracting means including at least one root extractor connected to the control unit and to the electromagnets for providing a control current to each said electromagnets which has a value which is a root of the control unit output current value.

3. The device of claim 2 further including a rectifier connected between said at least one root extractor and each said electromagnet, a different rectifier being connected to a different electromagnet, said rectifiers being connected in opposite electrical relation to said at least one root extractor.

4. The device of claim 2 wherein said at least one root extractor includes means for extracting the square root value of said control current value.

5. The device of claim 1 including a pair of electromagnets, said body being supported in the support direction by said pair of electromagnets which, in the direction of support, are opposite one another, said control unit controlling currents applied through each of the electromagnets, said root extracting means including an electronic root extractor coupled between said control unit and each said electromagnets, and a separate electronic rectifier corresponding to and coupled between each of the electromagnets and the root extractor, the rectifiers being electrically oppositely coupled to the root extractor.

6. The device of claim 5 including means for applying said root signal to each said electromagnets as a control current for that electromagnet, said rectifiers applying the root signal to the electromagnets in different time periods.

7. The device of claim 1 including a pair of electromagnets, during operation of said device said body being supported in the support direction by said pair of electromagnets, said electromagnets being opposite one another in the support direction, each said electromagnets receiving a control current controlled by said control unit which is common to the two electromagnets of the pair, said root extracting means including two root extractors, each unique to a corresponding different electromagnet and coupled to the control unit and to the corresponding electromagnet.

8. The device of claim 7 including two of said pairs of electromagnets in spaced relation, one of said root extractors being unique to and coupled to an electromagnet of one of said pairs, the other of said root extractors being unique to and coupled to an electromagnet of the other of said pairs.

9. The device of claim 8 including a rectifier between each said extractors and the associated electromagnet.

10. The device of claim 1 including a pair of electromagnets, during operation of said device said body being supported in the support direction by said pair of electromagnets, said electromagnets being opposite one another in the support direction, each said electromagnets receiving a control current controlled by said control unit which is common to the two electromagnets of the pair, said root extractor means including two rectifiers, one of said two rectifiers and one of said two root extractors being unique to one electromagnet and coupled between that electromagnet and the control unit, the other of said two rectifiers and root extractors being unique to the other of said pair of electromagnets and coupled between that other electromagnet and the control unit, said rectifiers being coupled in relative opposite electrical relation to said root extractors.

11. The device of claim 10 wherein the rectifiers are coupled between the corresponding root extractor and said control unit.

12. The device of claim 1 including a pair of electromagnets, during operation of said device said body being supported in the support direction by said pair of electromagnetis which, in the direction of support, are opposite one another, said control unit being common to the two electromagnetis of the pair and controlling currents applied through each of the electromagnets, said root extracting means including an electronic root extractor common to the two electromagnets and coupled between said control unit and each said electromagnets, and a pair of electronic rectifiers each unique to and coupled between an electromagnet and the root extractor, the rectifiers being electrically oppositely connected to the root extractor.

* * * * *